W. T. HOWE.
COMBINATION WAGON BED AND HAY FRAME.
APPLICATION FILED NOV. 13, 1916.
1,273,226.
Patented July 23, 1918.
3 SHEETS—SHEET 2.
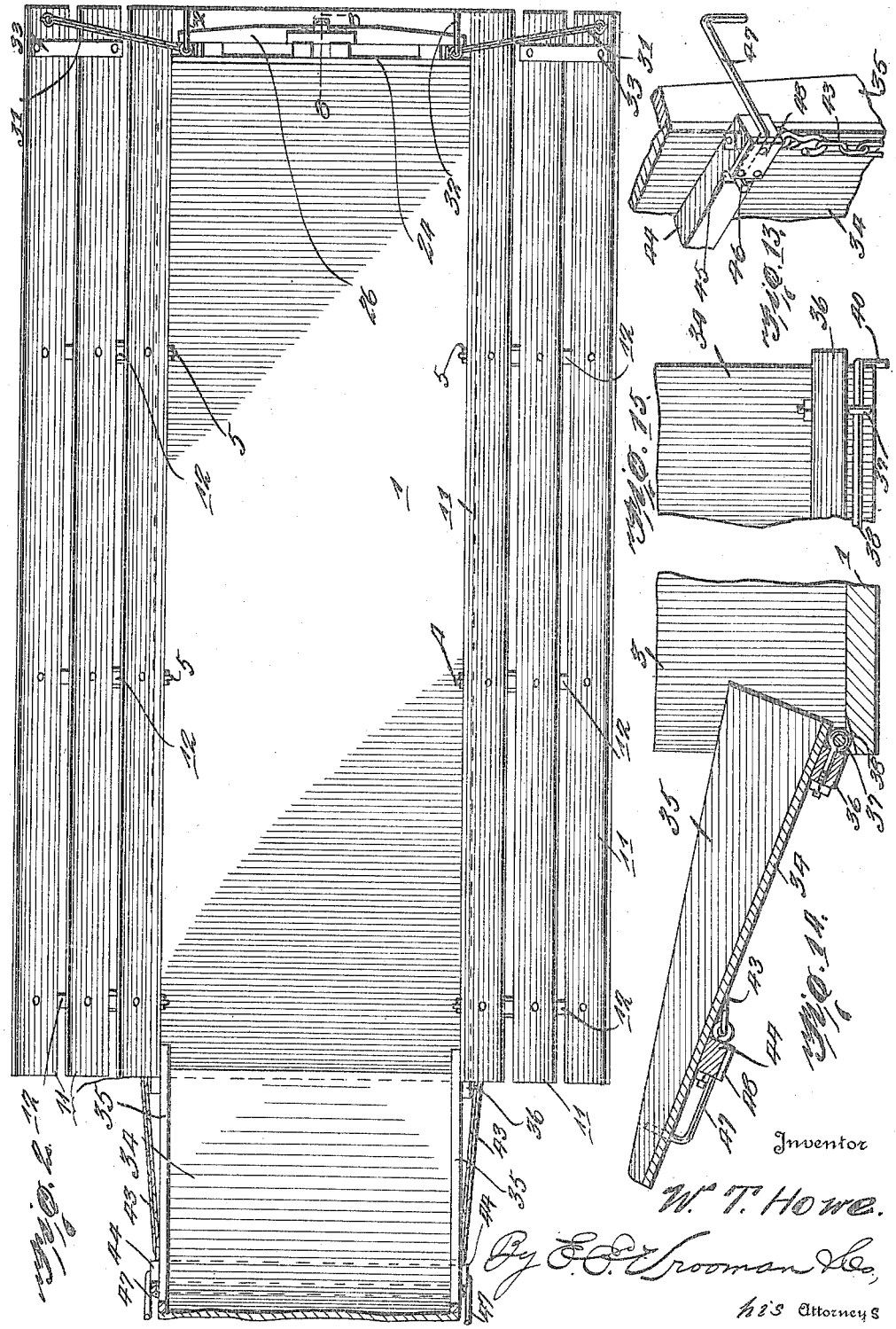

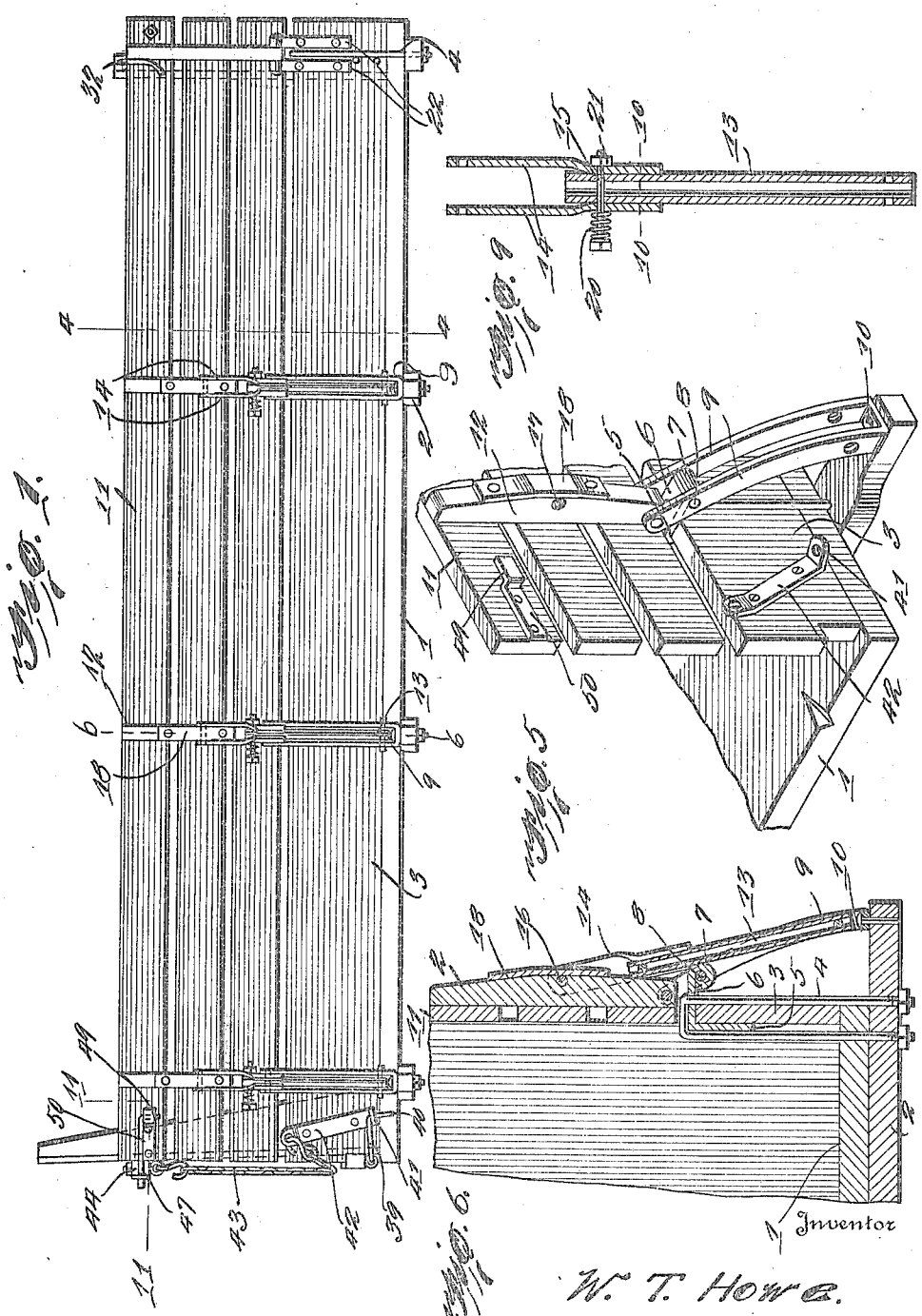

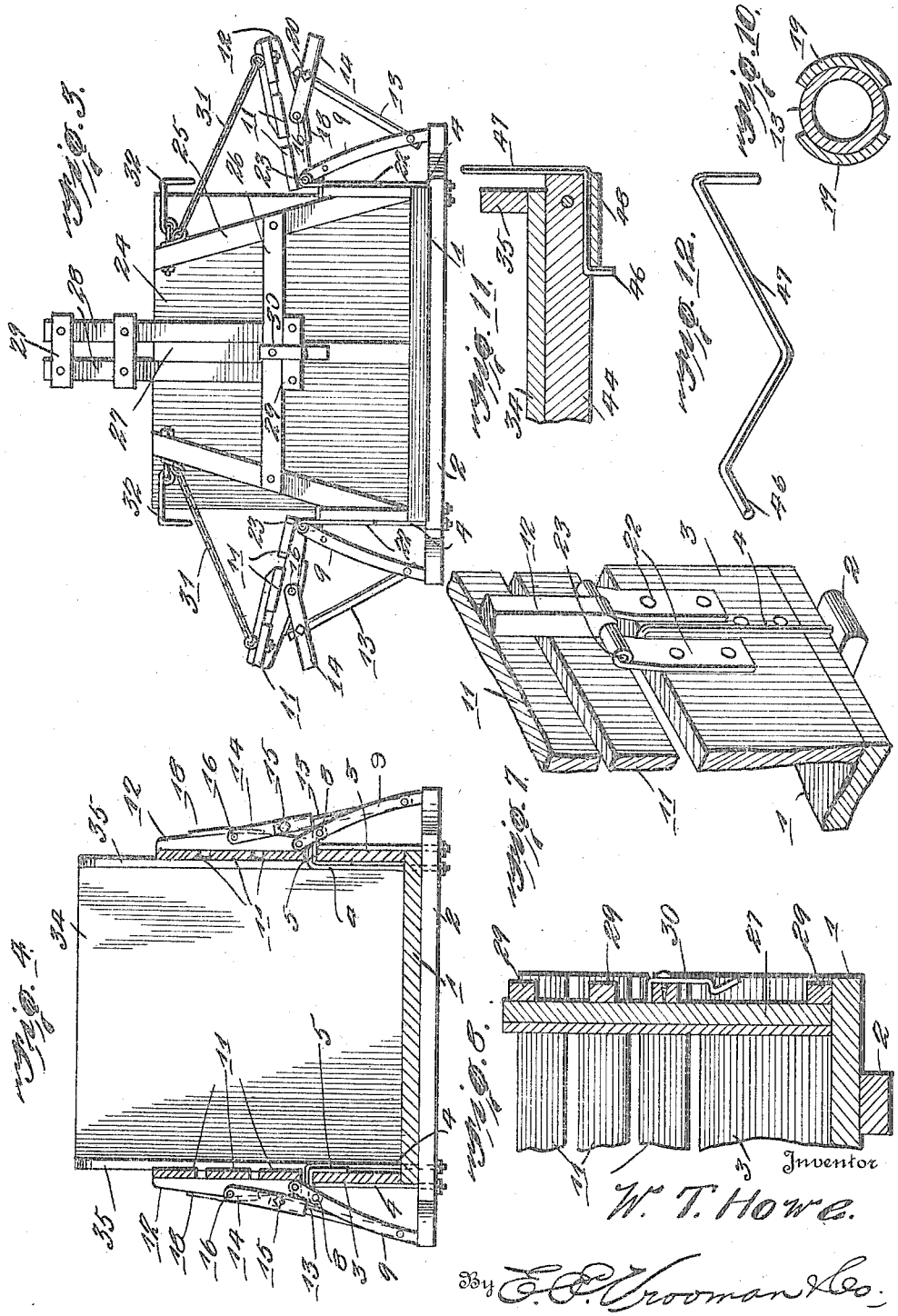

UNITED STATES PATENT OFFICE.

WILLIAM T. HOWE, OF MACON, MISSOURI.

COMBINATION WAGON-BED AND HAY-FRAME.

1,273,226.  Specification of Letters Patent.  Patented July 23, 1918.

Application filed November 13, 1916. Serial No. 131,082.

*To all whom it may concern:*

Be it known that I, WILLIAM T. HOWE, a citizen of the United States of America, residing at Macon, in the county of Macon and State of Missouri, have invented certain new and useful Improvements in Combination Wagon-Beds and Hay-Frames, of which the following is a specification, reference being had therein to the accompanying drawing.

This invention relates to a combination wagon bed and hay frame and has for its object the production of a simple and efficient mechanism whereby the sides of the wagon body may be quickly and conveniently thrown substantially at right angles to the body of the wagon in order to permit the same to be readily converted into a hay frame.

Another object of this invention is the production of a simple and efficient brace mechanism for supporting the sides either in a vertical or laterally extended position.

With these and other objects in view, this invention consists of certain novel combinations, constructions and arrangements of parts as will be hereinafter more fully described and claimed.

In the drawings:

Figure 1 is a side elevation of the wagon body.

Fig. 2 is a top plan view thereof arranged to constitute the hay frame.

Fig. 3 is a front elevation of the wagon body arranged to constitute a hay frame.

Fig. 4 is a section taken on line 4—4 of Fig. 1.

Fig. 5 is a detail perspective of the rear end of one corner of the wagon body.

Fig. 6 is a section taken on line 6—6 of Fig. 1.

Fig. 7 is a detail perspective of a portion of the forward end of the wagon body showing the manner in which the sides are hingedly secured to the lower panel of the wagon body.

Fig. 8 is a section taken on line 8—8 of Fig. 2.

Fig. 9 is a vertical section through the folding brace structure used in connection with the sides of the wagon body.

Fig. 10 is a section taken on line 10—10 of Fig. 9.

Fig. 11 is a section taken on line 11—11 of Fig. 1, the side of the wagon being removed.

Fig. 12 is a detail perspective of the latching hook shown in Fig. 11.

Fig. 13 is a detail perspective of one corner of the rear gate of the wagon body showing the retaining hook positioned thereon.

Fig. 14 is a longitudinal section through the rear gate showing the same hinged to the body of the wagon.

Fig. 15 is a rear elevation of the lower corner of the end gate of the wagon body.

By referring to the drawings it will be seen that 1 designates the bottom of the wagon body which is supported upon the usual transversely extending beams 2. A pair of side panels 3 are supported near the side edges of the base or bottom 1 as clearly illustrated in Figs. 1 and 4 of the drawings and substantially U-shaped yoke members 4 straddle the parallel panels 3 and pass through the base 1 and through the bars 2 as clearly illustrated in Fig. 4 for constituting an efficient means for holding the panels 3 in engagement with the base or bottom of the wagon. Substantially L-shaped plates 5 overhang the upper edges of the panels 3 and are provided with laterally projecting ends 6, which ends 6 are rolled to constitute the eyes 7 through which the transversely extending pins 8 pass, these pins 8 having their respective ends engaging the parallel arms 9 of the brace member 10, this brace member 10 being secured at its outer or lower end to the outer ends of the beams or bars 2.

An adjustable side member 11 is supported by each of the panels 3 and comprises a plurality of parallel longitudinally extending bars which bars are held firmly together by means of the vertically extending bracing members 12, these bracing members 12 being pivotally connected at their lower ends between the upper ends of the parallel members 9 of the brace 10 thereby constituting a very efficient pivot support for the adjustable side members 11. It should be understood that the yoke members 4 pass through and over the plates 5 as illustrated clearly in Fig. 6 of the drawings.

A folding brace member is connected to the brace member 10 and comprises a primary link 13 which is pivotally connected at its upper end to the parallel fingers 14 by means of the bolt 15. These fingers 14 are pivotally connected to the connecting members 12 by means of a pin 16 passing through the aperture 17 in the bracing member 12. A metallic strap passes over the aperture 17 and constitutes a means for holding the pin 16 against accidental displacement from the bracing members 12. The lower ends of the fingers 14 are bent inwardly and are formed substantially concavo-convex to straddle or conform to the shape of the primary link 13. The lower ends of these fingers 14 constitute gripping shanks 19. This structure is clearly illustrated in Fig. 10 of the drawings. A coil spring 20 is mounted upon the pin 15 and a nut 21 is also mounted upon the pin 15 so as to permit the tension of the spring 20 to be adjusted. The spring 20 is adapted to hold the shank portions 19 firmly around the links 13 and when the fingers 14 are extended in the same longitudinal plane as the links 13, it will be seen that the fingers 14 cannot be thrown to an angle with respect to the links 13 merely by the pressure upon the side member 11 for the reason that the position of the pivot pin 15 will constitute a dead center. However, when it is desired to swing the side of the wagon body at right angles to the panel 3 such as shown in Fig. 3, the operator will pull outwardly upon the ends of the pin 15 and swing the shank portions 19 out from gripping engagement with the link 13 and permit the sides of the wagon body to be swung to the desired adjusted position. The fingers 14 will extend at right angles to the link 13 when the side members 11 are swung to a laterally adjusted position.

A plurality of strap members 22 as shown in Fig. 7 are connected to the panel 3 near the forward end thereof the connecting members 12 forming a portion of the side members 11 and are adapted to be connected between these strap members 22 by means of the pin 23 which pin 23 constitutes a hinge therefor.

The front of the wagon body comprises a front plate 24 which plate is braced by means of a plurality of diagonally extending braces 25 and transversely extending member 26. A vertically extending bar 27 is carried by the front plate 24 and a pole supporting frame 28 is slidably mounted upon this vertically extending bar 27. The pole supporting frame 28 comprises a plurality of members which are connected by means of the transversely extending cleats 29. A spring latch 30 is carried by the transversely extending member 26 and is adapted to overhang the lower cleat 29 and hold the frame 28 in a vertically adjusted position when so desired for the purpose of supporting the hay pole.

A bracing chain 31 is connected to the upper end of each of the diagonally extending braces 25 and is also connected to the outer end of each of the side members 11 so as to limit the outward swing of these side members. Latching hooks 32 are also pivotally connected to the front portion of the wagon body and overhang the top of the side members 11 as shown in Fig. 1 so as to hold the side members 11 in a vertical position while the device is being used as a wagon body. The side members 11 are provided with cleats 33 upon the inner face thereof near the forward end of the wagon body which cleats are adapted to fit upon the outside of the plate 24 and constitute a brace for the upper end of the plate 24.

As shown in Figs. 1 and 14 an end gate 34 is used in connection with the wagon body and this end gate is entirely removable and comprises a flat plate having inwardly projecting bracing members 35 which members 35 taper toward the upper end of the end gate 34. A lower bracing bar 36 is connected to the lower end of the end gate and has a plurality of eyes 37 through which eyes 37 passes a rod 38 having inwardly extending ends 39 which are turned downwardly at their outer extremities as indicated by the numeral 40 for passing through the apertures 41 formed in the laterally extending end of the metallic strap 42 thereby constituting an adjustable or removable hinge connection for the end gate construction. Chains 43 are connected at their upper ends to the upper end of the end gate 34 and have their inner ends connected to the upper ends of the plates 42 thereby limiting the outward swing of the end gate.

An upper bracing bar 44 is connected to the end gate and overhangs the side edges thereof and constitutes an abutment for limiting the inward swing of the end gate. The transversely extending brace 44 is provided with a vertically extending notch 45 near each end thereof in which is adapted to fit the outwardly extending end 46 of the hook 47, the hook 47 being pivotally secured to the brace 44 by means of the plate 48. This hook 47 is adapted to fit over the offset end 49 of the plate 50 which plate 50 is carried upon the side member 11. It should be understood that by having the outwardly bent end 46 of the hook 47 fitting in the slot or notch 45 the swinging movement of the hook 47 will be limited.

From the foregoing description, it will be seen that a very simple and efficient construction has been produced, whereby a wagon body or bed may be readily and conveniently converted into a hay frame to suit the convenience of the operator, thereby permitting the wagon to be utilized for carrying a number of different kinds of articles.

It should be further understood that a very simple and efficient means has been produced whereby the wagon body may be easily converted into a hay frame without the necessity of re-assembling the wagon body for the reason that the side members may be readily swung to the desired position without the necessity of changing the base of the wagon body.

It should be further understood that the particular construction of the bracing members which are employed will constitute an efficient means for preventing the side of the wagon from being swung outwardly while it is desired to use the device merely as a wagon bed.

What is claimed is:

1. A wagon body of the class described comprising a pair of side panels, side members hingedly secured to said side panels, a bracing member comprising a plurality of parallel arms secured to said body, a bracing member carried by said side members, a primary link pivotally secured between the parallel arms of said first mentioned bracing member, a plurality of fingers secured to said primary link and pivotally connected to said bracing member carried by said side members, said last mentioned fingers provided with gripping shanks for gripping said primary link and holding said fingers parallel with said link, and means for firmly binding said gripping shanks upon the primary link.

2. A wagon body of the class described comprising a pair of side panels, side members hingedly secured to said side panels, a bracing member comprising a plurality of parallel arms secured to said body, a bracing member carried by said side members, a primary link pivotally secured between the parallel arms of said first mentioned bracing member, a plurality of fingers secured to said primary link and pivotally connected to said bracing member carried by said side members, said last mentioned fingers provided with gripping shanks for gripping said primary link and holding said fingers parallel with said link, a pin passing through said primary link and the inner ends of said gripping shanks, and a spring mounted upon said pin for yieldably holding said gripping shanks tightly upon said primary link.

In testimony whereof I hereunto affix my signature.

WILLIAM T. HOWE.

Copies of this patent may be obtained for five cents each, by addressing the "Commissioner of Patents, Washington, D. C."